United States Patent
Zhao et al.

(10) Patent No.: US 10,623,281 B1
(45) Date of Patent: Apr. 14, 2020

(54) DYNAMICALLY SCHEDULED CHECKPOINTS IN DISTRIBUTED DATA STREAMING SYSTEM

(71) Applicant: EMC IP Holding Company LLC, Hopkinton, MA (US)

(72) Inventors: Junping Zhao, Beijing (CN); Kevin Xu, Warren, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 34 days.

(21) Appl. No.: 15/490,504

(22) Filed: Apr. 18, 2017

(51) Int. Cl.
*G06F 15/173* (2006.01)
*H04L 12/24* (2006.01)
*H04L 12/26* (2006.01)

(52) U.S. Cl.
CPC ...... *H04L 41/5096* (2013.01); *H04L 41/0681* (2013.01); *H04L 41/5022* (2013.01); *H04L 41/5035* (2013.01); *H04L 43/0805* (2013.01)

(58) Field of Classification Search
CPC .. G06F 11/3072; G06F 11/1438; G06Q 10/10
USPC ........................................................ 709/231
See application file for complete search history.

(56) References Cited

U.S. PATENT DOCUMENTS

| | | | | |
|---|---|---|---|---|
| 5,630,157 A * | 5/1997 | Dwyer, III | ........ | G06F 9/30072 712/214 |
| 7,519,870 B1 * | 4/2009 | Sim-Tang | ........ | G06F 11/1471 714/48 |
| 7,865,608 B1 * | 1/2011 | Schuba | ........ | H04L 43/026 709/231 |
| 8,769,412 B2 * | 7/2014 | Gill | ........ | G06F 21/55 715/736 |
| 2002/0169644 A1 * | 11/2002 | Greene | ........ | G06Q 10/063112 705/7.18 |
| 2006/0112261 A1 * | 5/2006 | Yourst | ........ | G06F 9/3808 712/218 |
| 2009/0024622 A1 * | 1/2009 | Chkodrov | ........ | G06F 16/24568 |
| 2017/0308458 A1 * | 10/2017 | Cancilla | ........ | G06F 11/3636 |

OTHER PUBLICATIONS

The Apache Software Foundation, "Apache Storm," http://storm.apache.org/, 2015, 3 pages.
The Apache Software Foundation, "Introduction to Apache Flink," http://flink.apache.org/introduction.html, 2016, 5 pages.
A. Kekre, "Introducing Apache Apex (Incubating)," The Data Torrent Blog, https://www.datatorrent.com/blog/introducing-apache-apex-incubating/, Sep. 9, 2015, 6 pages.
The Apache Software Foundation, "Spark Streaming Apache Spark," http://spark.apache.org/streaming/, 2017, 2 pages.

(Continued)

*Primary Examiner* — Phuoc H Nguyen
(74) *Attorney, Agent, or Firm* — Ryan, Mason & Lewis, LLP

(57) ABSTRACT

One or more dynamically occurring events in a distributed data streaming system are monitored. The occurrence of at least one of the one or more dynamically occurring events is evaluated. A checkpoint operation is initiated in the distributed data streaming system based on the evaluation of the occurrence of the at least one dynamically occurring event.

20 Claims, 6 Drawing Sheets

(56) References Cited

OTHER PUBLICATIONS

F. Zhao et al., "Improved Reliable Streaming Processing: Apache Storm as Example," 2016 Hadoop Summit, Sep. 1, 2016, 34 pages, Melbourne, Australia.
N. Marz, "History of Apache Storm and Lessons Learned," http://nathanmarz.com/blog/history-of-apache-storm-and-lessons-learned.html, Oct. 6, 2014, 10 pages.
P. Carbone et al., "Lightweight Asynchronous Snapshots for Distributed Dataflows," https://arxiv.org/abs/1506.08603, Jun. 29, 2015, 8 pages.
G. Gupta, "An Introduction to Checkpointing in Apache Apex," The Data Torrent Blog, https://www.datatorrent.com/blog/blog-introduction-to-checkpoint/, Nov. 10, 2015, 2 pages.
The Apache Software Foundation, "Apache Hadoop YARN," https://hadoop.apache.org/docs/r2.7.2/hadoop-yarn/hadoop-yarn-site/YARN.html, 2016, 1 page.
The Apache Software Foundation, "What is Mesos? A distributed Systems Kernel," http://mesos.apache.org/, 2017, 1 page.
Supun Kamburugamuve, "Survey of Distributed Stream Processing for Large Stream Sources," PhD Qualifying Exam, Dec. 14, 2013, 16 pages.

\* cited by examiner

100

200

300

600

700

800

900

DYNAMICALLY SCHEDULED CHECKPOINTS IN DISTRIBUTED DATA STREAMING SYSTEM

FIELD

The field relates generally to information processing systems such as distributed data streaming systems, and more particularly to techniques for providing improved checkpoint operations in such distributed data streaming systems.

BACKGROUND

Distributed data streaming systems are information processing systems that receive large volumes of data typically from external data sources such as, by way of example, sensor networks, stock trading or other financial networks, web traffic sources, network monitoring sources, gaming systems, Internet of Things (IoT) networks, etc. The data generated by such data sources are typically unbounded sequences of messages that are received over long periods of time or even perpetually in some cases. Since large volumes of data are being ingested, the distributed data streaming system attempts to process the data using multiple compute nodes in a scalable and near real-time manner. Various data analytics may typically be performed on the data. Examples of such distributed streaming systems include, but are not limited to, Apache Storm™, Apache Flink®, Apex™, and Apache Spark™ (The Apache Software Foundation).

To cope with unexpected failures in such long-running or even perpetual systems, many existing data streaming systems support generation of state checkpoints (or simply, checkpoints) at pre-defined fixed intervals (e.g., every 10 seconds) or fixed events (e.g., every 100 messages). A checkpoint operation is an operation that involves saving a snapshot (copy or image) of the state of the system (e.g., data and system parameters) in permanent (persistent) shared storage, so that the data streaming system can restart from that failure point by reloading the most recent snapshot from the permanent shared storage.

SUMMARY

Embodiments of the invention provide improved checkpoint operations in distributed data streaming systems.

For example, in one embodiment, a method comprises the following steps. One or more dynamically occurring events in a distributed data streaming system are monitored. The occurrence of at least one of the one or more dynamically occurring events is evaluated. A checkpoint operation is initiated in the distributed data streaming system based on the evaluation of the occurrence of the at least one dynamically occurring event.

Advantageously, such dynamically scheduled checkpoint operations provide for efficiency, flexibility and performance, especially in large scaled or heavy loaded systems by reducing the consumption of system resources (e.g., compute/memory/input-output/network resources) and maintaining service level agreement compliance, as compared to fixed checkpoint operations.

These and other features and advantages of the invention will become more readily apparent from the accompanying drawings and the following detailed description.

DETAILED DESCRIPTION

Embodiments of the present invention provide a dynamically adjustable checkpoint mechanism for a distributed streaming system that is at least capable of one or more of: (i) initiating a checkpoint based on resource usage and/or service level agreement (SLA) performance; (ii) binding checkpoints to relevant system events, including but not necessarily limited to, upgrades, re-deployment, online scaling, etc., which can be important for long-running systems, but may cause unexpected exceptions; and (iii) optimizing execution and performance overhead by comprehensive evaluation, prioritization and selection of streams for checkpoints. A dynamically adjustable checkpoint mechanism for a distributed streaming system, in accordance with an embodiment of the present invention, is compatible with existing distributed checkpoint flow, can be smoothly integrated into existing systems, and provides improved protection with optimized resource and SLA impact when compared with existing systems.

Figure 1:
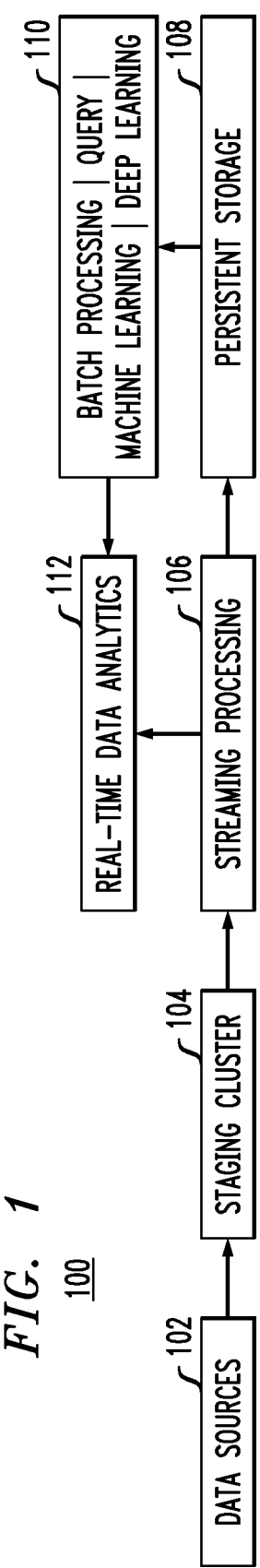
FIG. 1 illustrates a workflow for a distributed data streaming system within which one or more embodiments of the invention are implemented.

FIG. 1 illustrates a workflow 100 for a distributed data streaming system within which one or more embodiments of the invention are implemented. Referring to FIG. 1, distributed streaming systems perform processing of data streams from various data sources 102, such as, but not necessarily limited to, unbounded datasets, such as structured data (column store, advertisement pre-defined fields), unstructured data (logs, files), and/or video, click streams, etc. The data from the data sources 102 can flow to a staging cluster 104. The staging cluster 104 permits publishing and subscribing to streams of records from the data sources 102, storing of streams of records using fault-tolerant methods, and processing of streams of records as they occur. The staging cluster 104 builds real-time streaming data pipelines that reliably move data from the data sources 102 between systems or applications, and builds real-time streaming applications that transform or react to the streams of data from the data sources 102. The cluster 104 is run on one or more servers. An example of a commercially available staging cluster 104 is Apache Kafka™ offered by The Apache Software Foundation.

A data stream processing module 106 is operatively connected to and receives data from the staging cluster 104. The data stream processing module 106 performs data stream processing, which can include, but is not necessarily limited to, high performance processing logic running, for example, in memory, with millions/billions per second throughput and end-end latency within ms~sec to perform real-time data analytics 112. The processing can be highly scalable, whereby processing logic or operators are scaled to a plurality of nodes, and fault-tolerant, where processing of input messages is guaranteed, such as, for example, through exactly-once style, or at least once style, with checkpoints supported. Processing results can be stored in memory, such as persistent storage 108, where data is retained after processing ends and/or power is shut off (e.g., non-volatile storage). Data from persistent storage 108 may undergo batch processing 110 when resources permit to, for example, respond to queries, and perform machine and/or deep learning. The results of batch processing 110, such as, for example, learned trends and/or query results, can be used when performing real-time data analytics 112.

Figure 2:
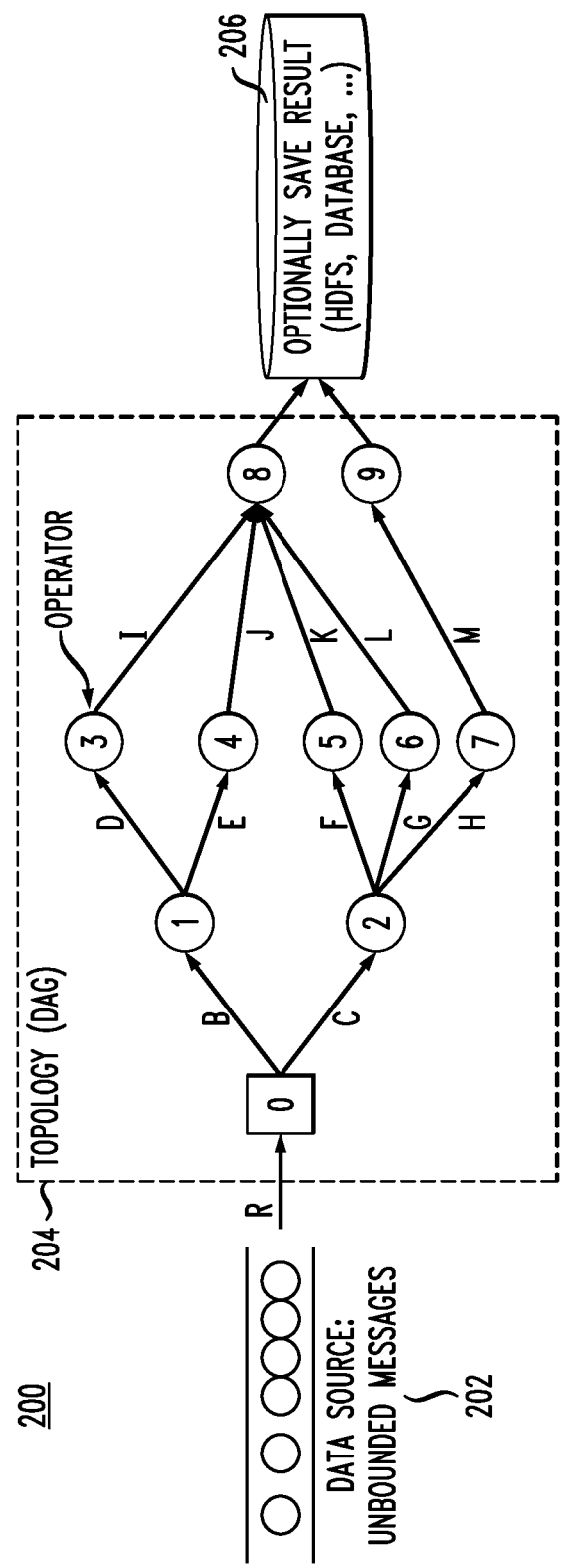
FIG. 2 illustrates a logical view of a distributed data streaming system within which one or more embodiments of the invention are implemented.

FIG. 2 illustrates a logical view of a distributed data streaming system 200 within which one or more embodiments of the invention are implemented. Referring to FIG. 2, distributed streaming is implemented in a topology 204 (e.g., Directed Acyclic Graph (DAG)), which includes operators (numbered vertices) and streams (lettered edges extending between the vertices). A stream is a sequence of data tuples (e.g., message). An operator represents the processing logic, with one or more input streams and emits one or more down streams. An operator may include many instances. Multiple operator instances could be scheduled to multiple physical or virtualized nodes, with affinity or anti-affinity policy rules.

As shown in FIG. 2, a data source 202 provides data, including, for example, unbounded messages, to topology 204 via an originating vertex (labeled 0), also referred to as a spout. The result of processing by the topology 204 is output to storage 206, for example, a distributed file system, such as, Hadoop® Distributed File System (HDFS) or other database.

Figure 3:
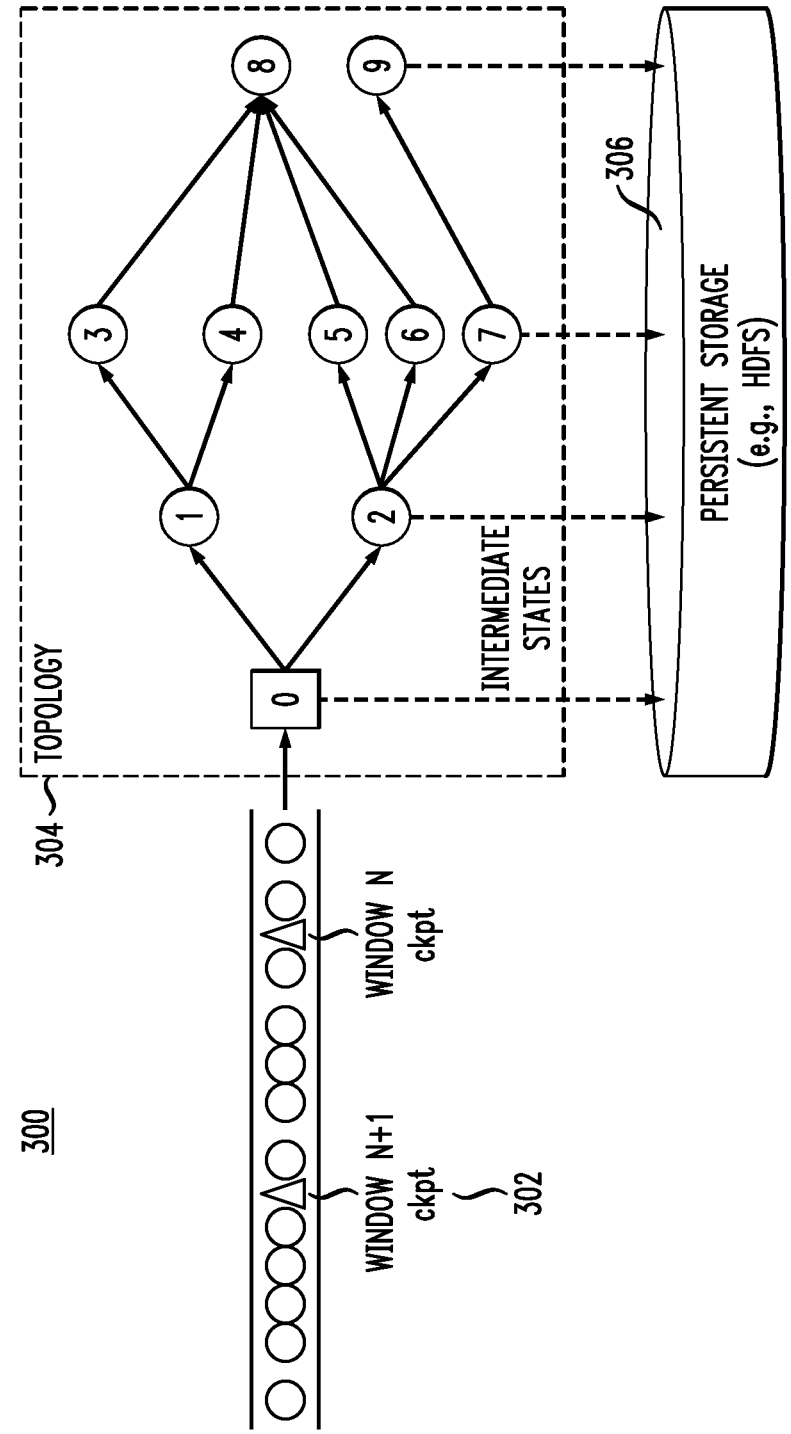
FIG. 3 illustrates the logical system view of FIG. 2 with distributed checkpoint operations using an embedded checkpoint control message.

FIG. 3 illustrates the logical system view of FIG. 2 with distributed checkpoint operations using an embedded checkpoint control message. Referring to FIG. 3, to protect against unexpected failure or unavailable cases, and thus achieve guaranteed or substantially guaranteed processing, the streaming system 300 incorporates failure detection by, for example, advanced per message tracking and detection, and necessary redo logic. More specifically, a distributed checkpoint (ckpt) mechanism is provided to snapshot relevant states in a distributed manner, so that given any failure, a system could replay the state from last snapshot. There may be multiple streams running in a cluster system, processing different data sources, where each stream may configure a checkpoint policy independently, including enable or not, at specified intervals.

Referring to FIG. 3, continuous incoming messages 302 are grouped in windows, each corresponding to a unique windowID, by, for example, a pre-set time interval or message count, where a checkpoint (ckpt) is performed. The operators in the topology 304 run at window granularity, which helps throughput. The checkpoints (ckpt) are performed at window boundaries via a dynamic injected special control message (e.g., ckpt start), as illustrated by the triangles in the message stream. The checkpoints (ckpt) can be performed at the window boundaries via an exposed application program interface (API) doCkpt(streamID, windowID).

Streaming is ingested, processed and emitted in the topology 304 (e.g. DAG), where a streaming system internally distinguishes checkpoint (ckpt) control messages, if found, and transmits snapshot intermediate states to persistent storage 306, such as, for example, local files or shared HDFS. This procedure is repeated for every operator. Depending on how the distributed checkpoint operations are implemented, states may be retained in a memory buffer, followed by an asynchronous (async) flush to persistent storage 306, which would commit a parent checkpoint (mark, then async to remove). As a result, if an operator fails and failure is detected, a system could attempt recovery from its parent operator.

Interval checkpointing includes checkpoints that are performed at a pre-defined pace, where a user typically specifies a checkpoint interval in terms of, for example, time or message count. Such interval checkpointing can result in heavy resource usage and have an adverse impact on performance. For example, a checkpoint (ckpt) interval set at seconds (e.g., 5 sec~60 sec) would constantly consume CPU resources (states collection, necessary serialization), memory resources (temp buffer), input/output (TO) resources (to persistent disk) and network resources (e.g., replicas in HDFS) for every stream at every interval. As a result, resource contention with normal processing is likely to occur, thus directly and/or indirectly impacting performance. Direct impact on performance may be due to blocking depending on how the checkpoint is implemented, and indirect impact on performance may be due to resource contention.

It can also be difficult to set up a proper checkpoint window or interval. For example, when a user must determine a checkpoint interval, a user must have sufficient knowledge of the workload and any variations thereof in order to configure a proper checkpoint window. Predetermined interval checkpointing also does not account for the need to respond or respond quickly to a dynamically occurring event. For example, ease of use and maintenance is important for long or constantly running systems. Accordingly, such systems may be subject to software and hardware upgrades, application logic modifications and re-deployments, system configuration changes, and/or online partitions and scale-outs. These kinds of operations or events may cause uncertain impact. Thus, there is a need for timely protection (e.g., dynamic checkpointing) which occurs prior to such operations or events, not only for specific stream/topology, but also for node or system-wide streams.

In accordance with an embodiment of the present invention, a dynamic injected checkpoint mechanism extends existing checkpoint capabilities and provides better reaction and protection for events including, but not necessarily limited to, system-based events such as online maintenance, a pending shutdown and/or a pending reboot, stream-based events such as stream modification, a stream redeployment and/or a stream partitioning, system resource-based events such as a system resource capacity maintaining a predetermined capacity level, and SLA-based events, such as maintaining SLA compliance.

The dynamic injected checkpoint mechanism can be smoothly integrated into existing checkpoint routines with unified management and flexible configuration and control, and may be especially useful for long-running distributed streaming systems.

Figure 4:
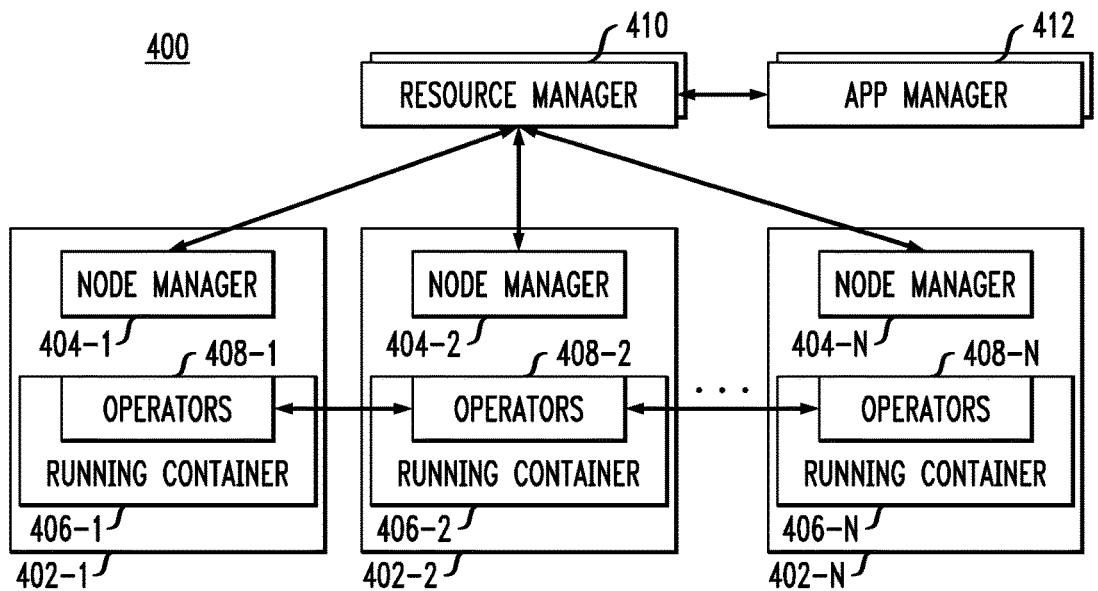
FIG. 4 illustrates an execution environment within which dynamically scheduled checkpoint functionality is implemented, according to an embodiment of the invention.

FIG. 4 illustrates an execution environment 400 within which dynamically scheduled checkpoint functionality is implemented, according to an embodiment of the invention. As shown in FIG. 4, the execution environment 400 includes nodes 402-1, 402-2, ... 402-N, a resource manager 410 and an application manager 412. Each node 402-1, 402-2, ... 402-N respectively includes a node manager 404-1, 404-2, ... 404-N and a running container 406-1, 406-2 and 406-N. Each running container 406-1, 406-2, ... 406-N respectively includes operators 408-1, 408-2, ... 408-N. The number of elements in execution environment 400 is not limited to what is shown, and an execution environment 400 may include more or less of each element.

The deployed stream topology, which represents the processing logic, could be scheduled or dynamically partitioned to multiple nodes 402-1, 402-2, ... 402-N, with necessary resource and task management by reference implementations, such as, for example, Apache YARN™, Mesos™ and application lifecycle management. The application (stream) manager 412 performs stream lifecycle management, including, but not limited to, submitting, deploying, redeploying and configuration. Part of the core intelligence of a distributed data streaming system with dynamically scheduled checkpoint functionality could be running in the application manager 412 along with interactions with other components. The resource manager 410 interacts with the node managers 404-1, 404-2, ... 404-N of each node 402-1, 402-2, ... 402-N, and performs overall system level resource management.

Each node manager 404-1, 404-2, ... 404-N monitors resources and tasks running on a given node 402-1, 402-2, ... 402-N, and reports results of the monitoring to the resource manager 410 to maintain heartbeat and health of each node 402-1, 402-2, ... 402-N. Each node 402-1, 402-2, ... 402-N includes a running container 406-1, 406-2, ... 406-N executing the logical operator running environment (e.g., JVM® available from Oracle America, Inc.). As explained herein, the operators 408-1, 408-2, ... 408-N execute specific data processing logic with input and/or output.

Figure 5:
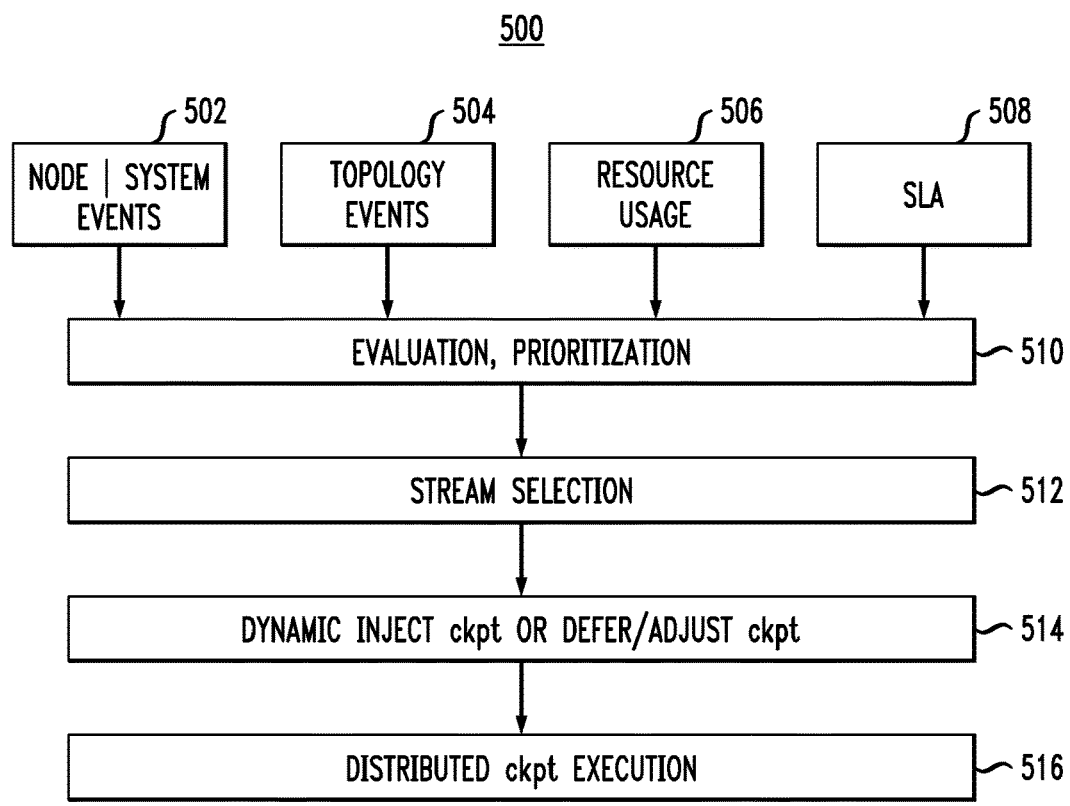
FIG. 5 illustrates a dynamic injected distributed checkpoint workflow, according to an embodiment of the invention.

FIG. 5 illustrates a dynamic injected distributed checkpoint workflow 500, according to an embodiment of the invention. As noted above, a dynamic injected checkpoint mechanism, in accordance with an embodiment of the present invention, can extend existing checkpoint capabilities and provides better reaction and protection for events. The dynamic injected checkpoint mechanism may be integrated into an existing checkpoint environment for a data streaming system, or implemented as a standalone checkpoint environment for a data streaming system.

Referring to FIG. 5, the events can include, but are not necessarily limited to, node or system-based events 502, topology events 504, resource usage events 506 and SLA events 508. Many exceptions happen during system maintenance. Embodiments of the present invention provide event registration and node or system level immediate checkpoints, which improve timing and provide better reaction and protection to specific/node-level or system wide streams. The node or system-based events 502 may include, for example, a node or system wide planned operation, such as a shutdown or reboot, a node or system wide configuration change (e.g., online configuration change) and/or upgrade to software or hardware. The topology events 504 may include, for example, modification to and/or re-deployment (e.g., online redeployment) of a stream, and/or partition and scale-out (e.g., online partition and scale-out) of a stream. Depending on event impact and scope, immediate checkpoints may be applied to a specific stream topology, or to multiple streams (such as in a particular node) or system wide.

The resource usage events 506 may include, for example, system resource-based events such as a system resource capacity maintaining a predetermined capacity level. A system resource may include, but is not necessarily limited to, one or more of a compute resource, a memory resource, an input-output resource, and a network resource of a distributed data streaming system. Long-running data processing may consume a considerable amount of resources, such as memory. A common challenge is garbage collection (e.g., Java® JVM® garbage collection), which removes objects no longer being used by an application, and which has significant performance impact to most or all running topologies in given node. Embodiments of the present invention monitor resource usage by, for example, leveraging node managers 404-1, 404-2, ... 404-N and resource manager 410, and schedule checkpoints to snapshot relevant states and free up resources, such as compute, memory, input-output and network resources, before node level performance reaches unacceptable levels and is severely degraded.

The SLA events 508 may include, for example, ensuring that a system remains compliant with an SLA. Checkpoints that occur too frequently due to, for example, improper checkpoint interval settings or unexpected resource or load pressures, may cause negative performance impacts, such as, but not necessarily limited to, CPU serialization, IO flush and/or networking problems, eventually negatively impacting a stream's SLA. For example, a snapshot may be stored in multiple persistent replicas in a distributed file system. Embodiments of the present invention monitor, for example, average stream processing speed given a window, and tune down existing settings if SLA requirements are not being met.

In addition to monitoring one or more dynamically occurring events in a distributed data streaming system, the embodiments of the present invention evaluate the occurrence of at least one of the one or more dynamically occurring events, and initiate a checkpoint operation in the distributed data streaming system based on the evaluation of the occurrence of the at least one dynamically occurring event. For example, referring to block 510 of FIG. 5, event type and a scope (e.g., system-wide, node or a specific stream) of the event's impact is evaluated and prioritized. More specifically, the one or more dynamically occurring events are prioritized such that the checkpoint operation is initiated in accordance with the prioritization. The prioritization may be a function of the level (e.g., scope) of the one or more dynamically occurring events. The event level can be a stream-level event, a system-level event, and/or a processing node-level event, wherein the distributed data streaming system comprises a plurality of processing nodes. In addition, the evaluating may include determining an impact that a checkpoint operation may have on the distributed data streaming system if initiated.

Referring to block 512 of FIG. 5, a stream or streams in which the checkpoint operation is to be initiated is selected based on the results of the evaluation and prioritization. Embodiments of the present invention may combine a plurality of incoming requests for identical action, and map to current stream deployment, by determining at which nodes streams are deployed. The selection of streams may be based on, for example, a configurable policy, such as selecting those streams most impacted by the events and/or the checkpoint operation.

Referring to blocks 514 of FIG. 5, initiating the checkpoint operation includes dynamically injecting a checkpoint request into the distributed data streaming system. At block 516, the checkpoint is executed in accordance with the checkpoint request. Alternatively, as per block 514, an existing checkpoint may be dynamically deferred or adjusted based on the results of the evaluation and prioritization.

Aspects of the present invention may be orchestrated and smoothly integrated together with central configuration, management and monitoring tools, and may be added to existing streaming systems such as, but not necessarily limited to, Apache Storm™, Apache Flink®, Apex™, and Apache Spark™.

Figure 6:
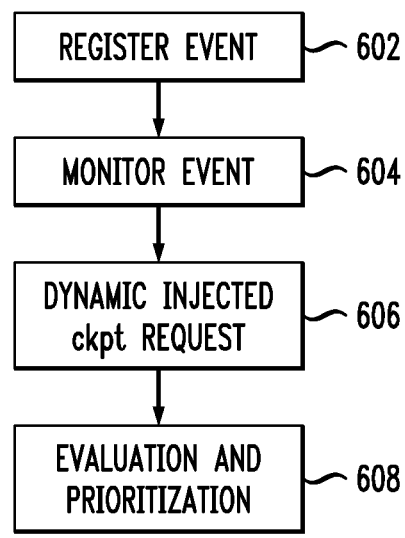
FIG. 6 illustrates an event bounded checkpoint methodology, according to an embodiment of the invention.

FIG. 6 illustrates an event bounded checkpoint methodology 600, according to an embodiment of the invention. Referring to blocks 602 and 604 of FIG. 6, one or more dynamically occurring events to be monitored are registered and the events are monitored. The registration can be performed via a user interface of a distributed data streaming system, such as, for example, central streaming management graphical user interface (GUI) or command-line interface (CLI), wherein the interface is configured to enable setting of one or more parameters that dictate initiation of the checkpoint operation.

Based on the occurrence of an event as described herein in connection with FIG. 5, at block 606, a new checkpoint request is generated with relevant context information attached for further evaluation. Depending on a potential scope of the event's impact, the event can be categorized as a stream-level event, a node-level event or a system-wide event. The stream-level event includes, for example, re-deployment, online scaling, and/or configuration parameter changes for a specific topology. A node-level event includes, for example, a shutdown, a reboot, and/or a parameter change on a specific node that may impact all topologies deployed in that node. A system-wide event includes, for example, an event where all nodes and all deployed topologies are impacted.

Referring to block 608, the new checkpoint request is evaluated and prioritized before any action is executed. The evaluation and prioritization can include mapping out potential impacted streams and correlating with policies before triggering a corresponding action, such as injecting a new checkpoint, or deferring an existing checkpoint window. Accordingly, immediate checkpoint protection can be provided system wide for later potential recovery, even though particular streams may not have had previously configured checkpoints or checkpoints running at a particular interval.

Figure 7:
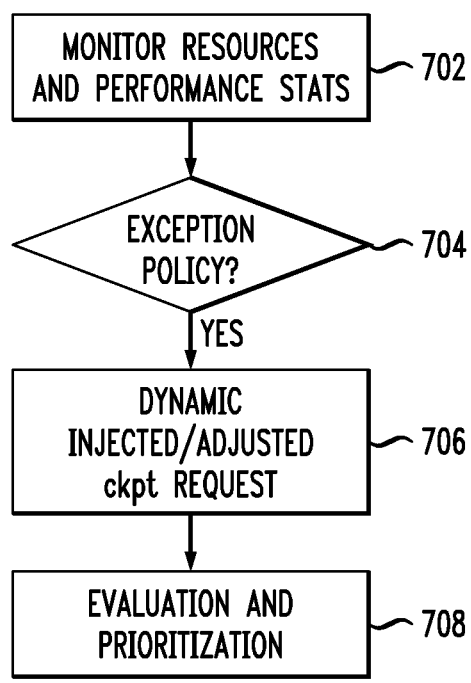
FIG. 7 illustrates a resource and service level agreement bounded checkpoint methodology, according to an embodiment of the invention.

FIG. 7 illustrates a resource and service level agreement bounded checkpoint methodology 700, according to an embodiment of the invention. Referring to block 702 of FIG. 7, resources and performance statistics are monitored. More specifically, relevant node and system resource usage, such as, but not necessarily limited to, system memory, Java® heap memory, CPU, disk 10 and networking IO, and per stream performance statistics, such as, but not necessarily limited to, latency and throughput, are monitored. Most of this information can be collected using tools such as Java® utilities, or retrieved from node managers 404-1, 404-2, . . . 404-N and resource manager 410.

At block 704, it is determined whether there is a conflict with a defined policy, for example a policy specified in an SLA, concerning, for example, resource and performance exceptions. If a conflict with an existing policy is found, as per block 706, a request to inject a new checkpoint or adjust a checkpoint interval is generated in order to maintain or bring the system into compliance with the policy. A request to inject a new checkpoint may, for example, release memory by freeing some stateful data to a disk, and a request to adjust checkpoint interval may, for example, change a checkpoint interval from every 10 sec to every 30 sec. As per block 708, the request with relevant context information will be evaluated and prioritized similar to that described in connection with FIG. 6.

Figure 8:
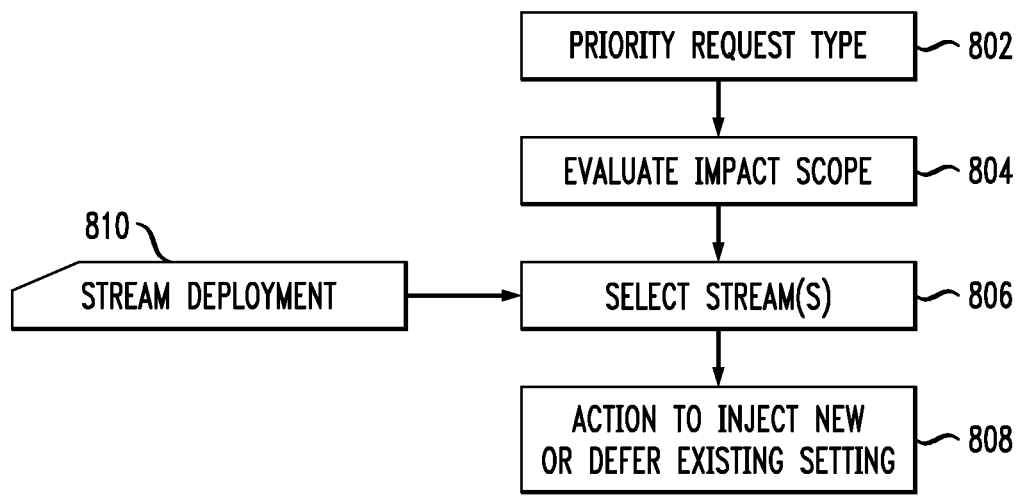
FIG. 8 illustrates a checkpoint evaluation request methodology, according to an embodiment of the invention.

FIG. 8 illustrates a checkpoint evaluation request methodology 800, according to an embodiment of the invention. Referring to block 802 of FIG. 8, a priority of a checkpoint request is evaluated based on a scope of the dynamically occurring event. For example, a system wide event and events that may change existing running streams such as, for example, node reboot or stream re-deployment, could be considered as top priority. In this case, it may be important to generate new checkpoints on all or specific streams. As one implementation option, immediate checkpoints shall be completed before such top priority system operations move ahead, thus providing timely protection (also referred to as "just-in-time" protection). Further, some continuous events that are classified as the same type could be combined, thus avoiding duplicate handling on specific streams.

Referring to block 804 of FIG. 8, in addition to evaluating an event's scope and impact, the impact and scope of a resource and/or SLA conflict is evaluated, including, for example, an evaluation of what node or nodes are impacted, and/or which streams are running on the impacted nodes. This information could be obtained from the resource and application managers 410, 412. Referring to block 806 of FIG. 8, based on stream deployment information 810, all or the top N relevant streams (where N is a predetermined number) are determined and selected. The top N relevant streams may be, for example, the most resource-consuming streams, longest running streams, most performance lagging streams, etc. according to given policies.

Referring to block 808 of FIG. 8, for each stream, action is taken to inject a new checkpoint or defer or enlarge an existing checkpoint interval (e.g. from 10 sec to 30 sec). A new checkpoint can be inserted via an application program interface (API) (such as doCkpt(streamID, windowID) discussed in connection with FIG. 3) due to, for example, an event requiring an immediate or timely solution. An existing checkpoint interval may be enlarged or deferred due to, for example, SLA parameters that are not being met. A checkpoint interval may be adjusted back to an original setting once the parameters of the SLA are met. Newly injected checkpoints may follow existing distributed checkpoint flow that takes a snapshot on each operator in its deployed node. A checkpoint can be in the form of a file, and have a pre-defined naming syntax.

Figure 9:
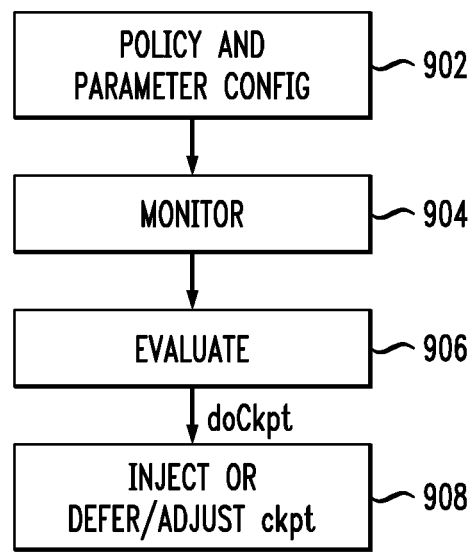
FIG. 9 illustrates an overall integrated checkpoint methodology, according to an embodiment of the invention.

FIG. 9 illustrates an overall integrated checkpoint methodology 900, according to an embodiment of the invention. Referring to block 902 of FIG. 9, a user can configure relevant parameters and policies for determining whether to inject a new checkpoint and/or defer/alter an existing checkpoint. The policies and parameters can be configured via interfaces, for example, central GUI/CLI. Non-limiting illustrative examples of parameters and policies can include, but are not necessarily limited to, resource usage related policies (e.g., Java® heap memory usage cannot exceed a specified percentage on a specific node for a given time period), SLA performance related policies (e.g., flag stream average latency continuously missing by a specified amount for a given time period), evaluation related policies (e.g., high priority or top N streams are selected for generation of new checkpoints), and action related policies (e.g., execute new checkpoint immediately or wait for the next same type of request to combine with prior request, or new checkpoint naming syntax, such as streamID_windowID_eventType_timestamp).

As described herein, referring to blocks 904, 906 and 908 of FIG. 9, one or more dynamically occurring events in a distributed data streaming system are monitored (block 904), the occurrence of at least one of the one or more dynamically occurring events is evaluated (block 906), and a checkpoint operation in the distributed data streaming system is injected or deferred/adjusted based on the evaluation of the occurrence of the at least one dynamically occurring event (block 908). The checkpoints can be executed via an exposed API, such as doCkpt. Non-limiting illustrative examples of monitoring registered events, and resource usage and performance statistics are described in connection with FIGS. 6 and 7, respectively. A non-limiting illustrative example of evaluation procedures is described in connection with FIG. 8.

As noted herein, embodiments of the present invention can be integrated with existing distributed streaming systems, and may co-exist with conventional checkpoint functionality, where dynamically scheduled checkpoints are given higher priority.

At least portions of the distributed data streaming system with dynamically scheduled checkpoint functionality shown in FIGS. 1-9 may be implemented using one or more processing platforms. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to an executed on or across a portion of one or more virtual or physical processors. An illustrative embodiment of a processing platform will now be described in greater detail in conjunction with FIG. 10.

As is apparent from the above, one or more of the processing modules or other components of the distributed data streaming system with dynamically scheduled checkpoint functionality shown in FIGS. 1-9 may each run on a computer, server, storage device or other processing platform element. A given such element may be viewed as an example of what is more generally referred to herein as a "processing device." An example of such a processing platform is processing platform 1000 shown in FIG. 10.

The processing platform 1000 in this embodiment comprises a plurality of processing devices, denoted 1002-1, 1002-2, 1002-3, . . . 1002-N, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 10:
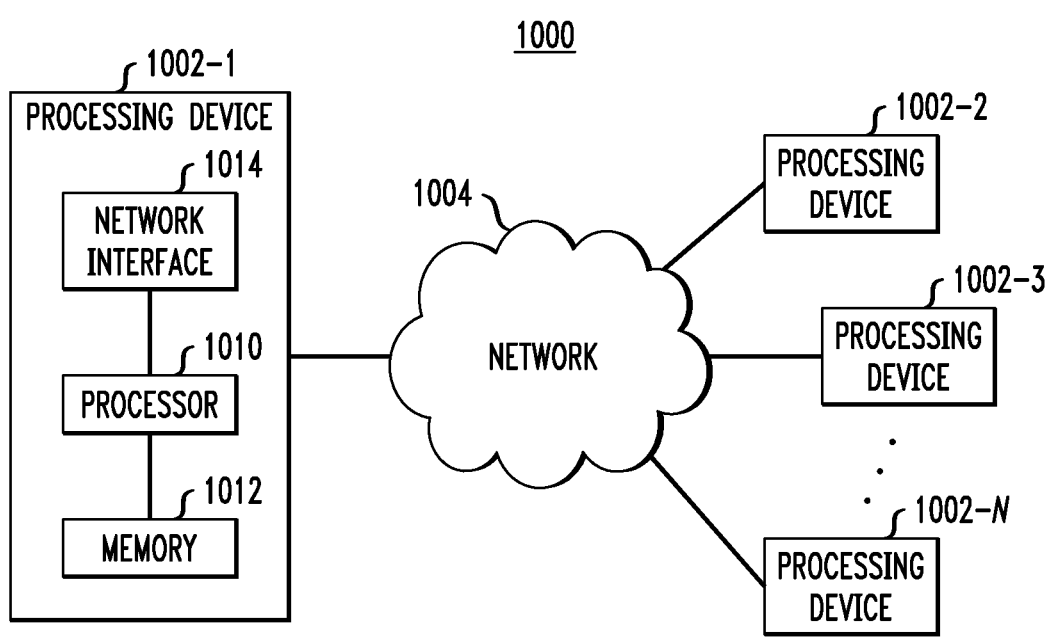
FIG. 10 illustrates a processing platform used to implement a distributed data streaming system with dynamically scheduled checkpoint functionality, according to an embodiment of the invention.

Also included in the processing device 1002-1 of the example embodiment of FIG. 10 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the distributed data streaming systems, although in other embodiments a given tenant can have multiple containers. The containers may be utilized to implement a variety of different types of functionality within the distributed data streaming systems. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a value-based governance system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the distributed data streaming system with dynamically scheduled checkpoint functionality. Such components can communicate with other elements of the distributed data streaming system over any type of network or other communication media.

As indicated previously, in some embodiments, components of the distributed data streaming system with dynamically scheduled checkpoint functionality as disclosed herein can be implemented at least in part in the form of one or more software programs stored in memory and executed by a processor of a processing device. For example, at least portions of the execution environment or other distributed data streaming system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of distributed data streaming systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
monitoring one or more dynamically occurring events in a distributed data streaming system;
dynamically injecting a checkpoint request into the distributed data streaming system based on the occurrence of at least one of the one or more dynamically occurring events;
evaluating the checkpoint request;
dynamically scheduling a checkpoint operation based on the results of evaluating the checkpoint request; and
initiating the checkpoint operation in the distributed data streaming system based on the dynamic scheduling;
wherein the dynamically scheduled checkpoint operation is integrated with a predetermined checkpoint operation;
wherein the distributed data streaming system is implemented via one or more processing devices each comprising a processor coupled to a memory.

2. The method of claim 1, where in the one or more dynamically occurring events comprise a system-based event.

3. The method of claim 2, wherein the system-based event comprises at least one of a pending shutdown and a pending reboot.

4. The method of claim 1, wherein the evaluating step further comprises prioritizing the one or more dynamically occurring events such that the checkpoint operation is initiated in accordance with the prioritization.

5. The method of claim 4, wherein the prioritization is a function of the level of the one or more dynamically occurring events.

6. The method of claim 5, wherein the level of the one or more dynamically occurring events comprises one of a stream-level event, a system-level event, and a processing node-level event, wherein the distributed data streaming system comprises a plurality of processing nodes.

7. The method of claim 1, wherein the evaluating step further comprises determining an impact that a checkpoint operation may have on the distributed data streaming system if initiated.

8. The method of claim 1, further comprising registering the one or more dynamically occurring events to be monitored.

9. The method of claim 8, wherein the one or more dynamically occurring events to be monitored are registered via a user interface of the distributed data streaming system.

10. The method of claim 9, wherein the interface is configured to enable setting of one or more parameters that dictate initiation of the checkpoint operation.

11. The method of claim 1, wherein the one or more dynamically occurring events comprise a stream-based event.

12. The method of claim 11, wherein the stream-based event comprises at least one of a stream modification, a stream redeployment, and a stream partitioning.

13. The method of claim 1, wherein the one or more dynamically occurring events comprise a system resource-based event.

14. The method of claim 13, wherein a system resource comprises one or more of a system resource capacity maintaining a predetermined capacity level, a compute resource, a memory resource, an input-output resource, and a network resource of the distributed data streaming system.

15. The method of claim 1, wherein the one or more dynamically occurring events comprise a service level agreement-based event.

16. The method of claim 15, wherein the service level agreement-based event comprises a service level agreement remaining compliant.

17. A system comprising:
at least one processor, coupled to a memory, and configured to:
monitor one or more dynamically occurring events in a distributed data streaming system;
dynamically inject a checkpoint request into the distributed data streaming system based on the occurrence of at least one of the one or more dynamically occurring events;
evaluate the checkpoint request;

dynamically schedule a checkpoint operation based on the results of evaluating the checkpoint request; and initiate the checkpoint operation in the distributed data streaming system based on the dynamic scheduling;

wherein the dynamically scheduled checkpoint operation is integrated with a predetermined checkpoint operation.

18. The system of claim 17, where in the one or more dynamically occurring events comprise a system-based event.

19. A computer program product comprising a non-transitory processor-readable storage medium having stored therein program code of one or more software programs, wherein the program code when executed by at least one processing device causes said at least one processing device to:

monitoring one or more dynamically occurring events in a distributed data streaming system;

dynamically injecting a checkpoint request into the distributed data streaming system based on the occurrence of at least one of the one or more dynamically occurring events;

evaluating the checkpoint request;

dynamically scheduling a checkpoint operation based on the results of evaluating the checkpoint request; and initiating the checkpoint operation in the distributed data streaming system based on the dynamic scheduling;

wherein the dynamically scheduled checkpoint operation is integrated with a predetermined checkpoint operation.

20. The computer program product of claim 19, where in the one or more dynamically occurring events comprise a system-based event.

* * * * *